UNITED STATES PATENT OFFICE.

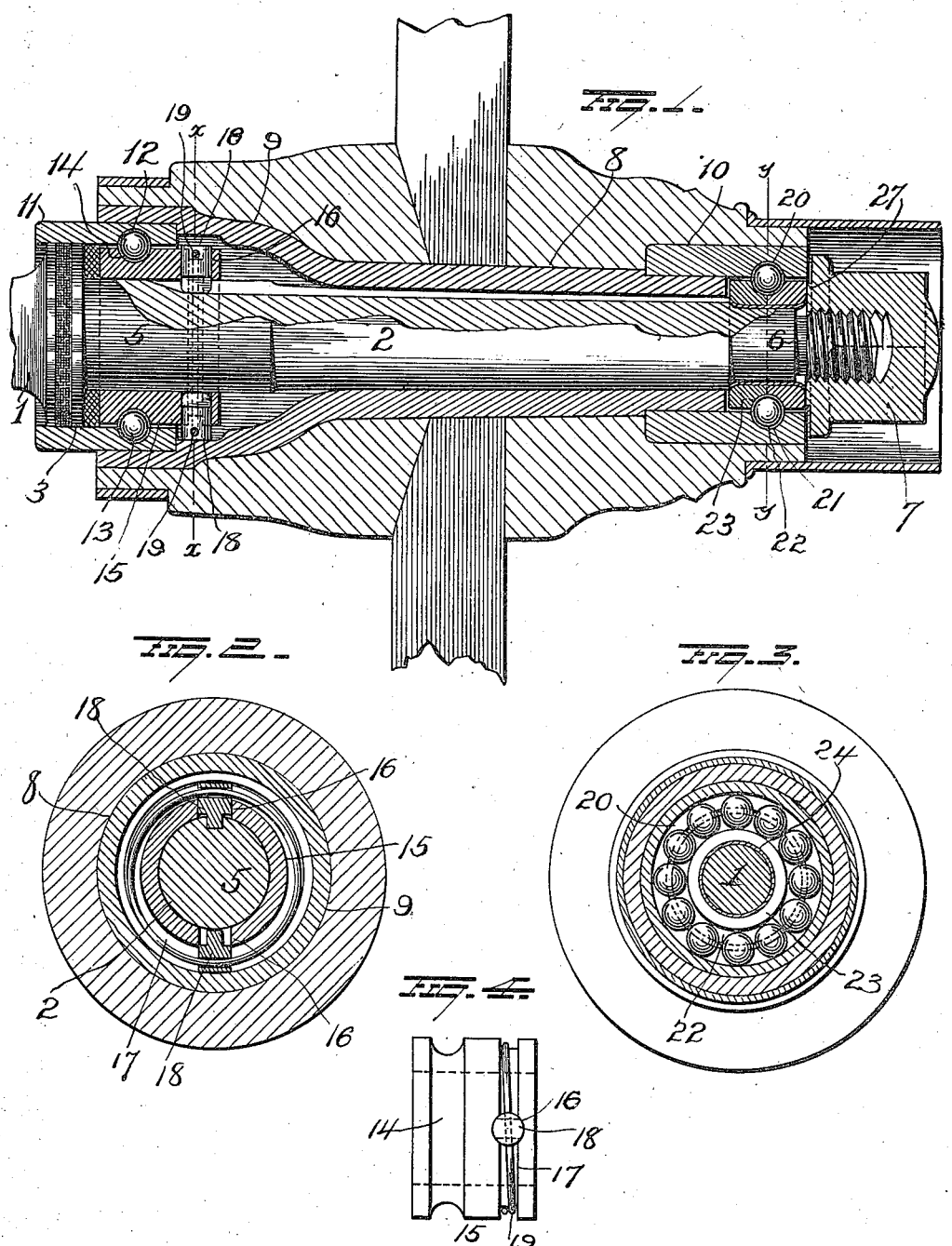

ALFRED H. WORREST, OF LANCASTER, PENNSYLVANIA.

WHEEL-MOUNTING.

1,155,538.  Specification of Letters Patent.  Patented Oct. 5, 1915.

Application filed March 15, 1913. Serial No. 754,616.

*To all whom it may concern:*

Be it known that I, ALFRED H. WORREST, of Lancaster, in the county of Lancaster and State of Pennsylvania, have invented certain new and useful Improvements in Wheel-Mountings; and I do hereby declare the following to be a full, clear, and exact description of the invention, such as will enable others skilled in the art to which it appertains to make and use the same.

This invention relates to improvements in mountings and more particularly to means for effecting the mountings of the axle box of a wheel upon the axle spindle,—one object of the invention being to provide simple and efficient means whereby the fixed race-way sleeves of a ball-bearing mounting shall be applied to the spindle in such manner as to effectually prevent them from turning thus eliminating wear between said raceway sleeves and the spindle.

A further object is to construct the mounting in such manner that the inner raceway sleeves shall be permanently located within the axle box but readily removable with the latter from the spindle, and so that the positions of said inner raceway sleeves relatively to the spindle may be readily adjusted to compensate for wear of the bearing faces of said raceways.

With these and other objects in view, the invention consists in certain novel features of construction and combinations of parts as hereinafter set forth and pointed out in the claims.

In the accompanying drawings, Figure 1 is a longitudinal sectional view illustrating a mounting embodying my improvements; Fig. 2 is a sectional view on the line *x—x* of Fig. 1; Fig. 3 is a sectional view on the line *y—y* of Fig. 1, and Fig. 4 is a view in side elevation of the raceway sleeve 15.

1 represents a portion of an axle provided with a spindle 2 having a shoulder 3 at its juncture with the axle and with a longitudinal groove or key seat which may extend from end to end of said spindle. The major portion of the spindle may be made tapering, but a portion at the inner end thereof near the shoulder 3 is made cylindrical as indicated at 5. The other end of the spindle is contracted somewhat to form an annular shoulder 6 and the free end of the contracted portion of the spindle is threaded for the reception of a nut 7 as will be more fully hereinafter explained.

An axle box 8 is mounted on the spindle 2 and its rear end is enlarged as shown at 9, the outer end of the axle box being enlarged by means of a sleeve 10 which is pressed or otherwise secured on the outer end of the tubular portion of the axle-box. A sleeve 11 is pressed or otherwise secured in the enlarged rear portion of the axle-box and this sleeve is provided interiorly with an annular groove which forms a raceway 12 for an annular series of balls 13. The coöperating raceway 14 for these balls is formed by means of a groove in the exterior peripheral face of a sleeve 15 and these raceways 12 and 14 have such depth that the balls will be almost completely inclosed, thus giving bearings for the balls throughout nearly the whole of their surfaces. By such construction, the butt raceway sleeve 15 (which is secured to the spindle as presently explained) will be permanently located within the axle box and will be removable with the latter from the spindle.

The butt raceway sleeve 15 will (when the parts are assembled on the spindle) be disposed on the cylindrical portion 5 of the spindle from which it may be readily removed without danger of wedging or binding, when the wheel is removed from the spindle. It is important however, that, when in use, the butt raceway sleeve shall be prevented from turning on the spindle, as otherwise said sleeve and also the spindle itself would be subjected to wear and the sleeve would ultimately become sufficiently loose to permit rattling. Furthermore, means for locking the raceway sleeve to the spindle and for effecting its adjustment relatively thereto to compensate for wear of the lower portion of the bearing, should be such as to facilitate the assembling or application of the wheel on the spindle. To insure the accomplishment of these results, the features of construction now to be explained are employed.

The butt raceway sleeve 15 is provided with any desired number of radial holes 16 and said sleeve is made in its outer face with an annular groove 17 which intersects these. Pins or keys 18 pass loosely through the holes 16, and each is provided with a transverse hole for the passage of a spring 19. This spring may conveniently be made of a single piece of spring wire encircling the sleeve within the groove 17 therein, and serves to press the pins or keys inwardly and permit them to yield outwardly. In the drawing, I have shown two spring-pressed pins or keys, but a greater or less number may be employed.

In the act of placing a wheel on the spindle, there will be no necessity for the operator to search for the groove or keyway in the spindle in order to cause a key in the sleeve 15 to enter the same. Both pins or keys are free to yield and when the sleeve becomes disposed on the cylindrical portion 5 of the spindle, one of the pins or keys will be forced into the groove or keyway 4 in the spindle automatically, while the remaining key or keys will be pressed outwardly by engagement with the spindle. By using a single spring for all the pins or keys, the key or keys which are pressed outwardly will place the spring under greater than its normal tension and hence the retention of the single key in the groove or keyway 4 will be insured.

As is well known, the under portion of the stationary raceway (the raceway of sleeve 15 in the present instance) will wear faster than the upper portion. In order to compensate for such wear, the wheel may be removed and then replaced in a manner to cause a different key to engage the keyway,—thus, in effect turning the sleeve so that a different or less worn portion of the raceway will become disposed at the bottom.

The sleeve 10 which forms the forward portion of the axle box is provided interiorly with a groove or raceway 20 for the accommodation of balls 21 and the coöperating groove or raceway 22 is formed in a raceway sleeve 23 held within the sleeve 10 when the axle box is removed from the spindle, by said balls. The raceway sleeve 23 comprises two identical sections held together by a tube 24 passing through said sections and upset at its ends.

When the axle box containing the raceway sleeves 15 and 23, is placed on the spindle, the raceway sleeve will become disposed on the butt end of the spindle and locked thereto as hereinbefore explained, and the inner end of the outer raceway sleeve 23 will abut against the shoulder 6 near the outer end of the spindle. A point nut 7 will then be screwed on the threaded end of the spindle and this nut is made on its inner face surrounding the threaded opening therein, with an annular enlargement 27 which engages the outer end of the raceway sleeve 23. In this manner, the outer raceway sleeve 23 is clamped tightly between the shoulder 6 and the nut 7 and is thus held rigidly on the spindle.

As the raceway sleeve 15 is removable with the axle box, it is apparent that by removing the wheel and then replacing it so that the sleeve 15 will be differently disposed on the spindle, adjustment of said sleeve for wear may be effected.

Having fully described my invention what I claim as new and desire to secure by Letters Patent, is:—

1. The combination in a device of the character described, of a spindle having a single groove, a removable radial bearing device encircling the inner end portion of the spindle, a plurality of keys passing freely through a wall of the removable bearing device, and a single spring engaging said keys and pressing them into engagement with the spindle, one of said keys adapted to enter the groove in the spindle.

2. The combination in a device of the character described, of a spindle having a recess, a removable ring encircling said spindle and having an annular groove in its peripheral wall and having a plurality of key holes arranged transversely through the wall of the ring and communicating with said annular groove, keys passing freely through said key holes, and a spring disposed in said annular groove of the ring and engaging each of said keys to press any one of them into the recess in the spindle.

In testimony whereof, I have signed this specification in the presence of two subscribing witnesses.

ALFRED H. WORREST.

Witnesses:
REUBEN MARTIN,
CHAS. S. MARTIN.